United States Patent [19]

Rodriguez

[11] Patent Number: 5,362,520
[45] Date of Patent: Nov. 8, 1994

[54] BLEACHING AND FINISHING COMPOSITION AND METHOD

[76] Inventor: Ricardo M. Rodriguez, 24 Broadway, Apt. 7, Jersey City, N.J. 07306

[21] Appl. No.: 110,012

[22] Filed: Aug. 23, 1993

[51] Int. Cl.$^5$ .................. B05D 1/00; B05D 7/06
[52] U.S. Cl. .................. 427/393; 427/408; 427/440; 428/541; 8/101; 8/107; 8/111; 252/186.1; 252/187.34; 252/186.42
[58] Field of Search .................. 427/393, 408, 440; 428/541; 8/101, 102, 107, 108.1, 109, 111; 252/186.1–187.34

[56] References Cited

U.S. PATENT DOCUMENTS

| | | | |
|---|---|---|---|
| 3,900,619 | 8/1975 | Lalk et al. | 427/408 |
| 4,678,824 | 7/1987 | Laurra | 524/48 |
| 4,732,817 | 3/1988 | Lotz et al. | 428/541 |
| 5,077,098 | 12/1991 | Chow | 427/397 |
| 5,196,139 | 3/1993 | Moschner | 252/186.25 |

OTHER PUBLICATIONS

The Condensed Chemical Dictionary, 10th Edition, Copyright, 1981 pp. 27, 60, 943, 992.

*Primary Examiner*—Shrive Beck
*Assistant Examiner*—Brian K. Talbot

[57] ABSTRACT

A new and improved bleaching and finishing composition for bleaching and finishing a solid substrate includes a first component blend which includes a quantity of a latex resin and a quantity of a bleaching solution. A second component blend includes a quantity of a latex resin, a quantity of an alcohol, a quantity of water, a quantity of a substrate treating material, and a quantity of an alkalizing agent. The first component blend and the second component blend are maintained separated from each other in storage, and the first component blend and the second component blend may be mixed together prior to use on the substrate. Preferably, the substrate is wood. The second component blend may also include a quantity of a coloring agent for tinting the substrate to a desired shade of color. Also, a method is provided for bleaching and finishing a solid substrate. In the method, the first component blend and the second component blend are mixed together to form a mixture, and the mixture is applied to a wooden substrate and dried.

6 Claims, 1 Drawing Sheet

STEP NO. 1 — MIX COMP. A AND COMP B

STEP NO. 2 — APPLY MIXTURE TO WOOD SURFACE

STEP NO. 3 — DRY TREATED SURFACE

FIG 1

| | |
|---|---|
| STEP NO. 1 | MIX COMP. A AND COMP B |
| STEP NO. 2 | APPLY MIXTURE TO WOOD SURFACE |
| STEP NO. 3 | DRY TREATED SURFACE |

FIG 2

| | |
|---|---|
| STEP NO. 1 | APPLY COMP. A TO WOOD SURFACE |
| STEP NO. 2 | DRY TREATED SURFACE |
| STEP NO. 3 | APPLY COMP. B TO PREVIOUSLY DRIED TREATED SURFACE |
| STEP NO. 4 | DRY TREATED SURFACE |

BLEACHING AND FINISHING COMPOSITION AND METHOD

BACKGROUND OF THE INVENTION

Field of the Invention

The present invention relates generally to wood treatment, and, more particularly, to removing stains from wood and providing the wood with a finish.

Description of the Prior Art

When wood becomes discolored by fungus, molds, and other organisms, its quality and commercial value suffer, and its uses reduce to a few minor applications. A product exists known as wood bleach, but this product presents a number of problems. First, wood bleach does not completely remove discoloration. Wood bleach poses serious problems with respect to dimensional stability such as shrinkage, grain-raising, and color reversion. In this respect, it would be desirable if a composition and method were provided that removes discoloration to a greater extent than prior art wood treating techniques. It would also be desirable if a composition and method were provided that reduces problems of dimensional stability of the wood that occur with the use of conventional techniques for removing biological staining.

Another conventional approach to eliminate unsightly biological staining is to cover the biological stains with a stain sealer. However, a stain sealer not only covers over undesirable biological stains, stain sealers also cover over important features in the wood that are desirable. For example, a stain sealer can obscure or matte the surface. In this respect, it would be desirable if a composition and method were provided that reduced biological stains on wood without obscuring or matting the surface of the wood.

Throughout the years, in addition to the prior art methods discussed above, a number of innovations have been developed relating to bleaching stains from wood materials, and the following U.S. patents are representative of some of those innovations: U.S. Pat. Nos. 3,423,283; 3,652,407; 4,144,089; 4,938,842; and 5,013,404.

More specifically, with the exception of U.S. Pat. No. 4,144,089, the above-cited patents disclose methods of bleaching wood pulp. The methods employ large containers in which the wood pulp and the bleaching agents are added together and mixed. The objective is to completely bleach the wood pulp through and through. Such methods are not useful in treating solid wood so at to treat just the surface of the wood without disturbing dimensional stability and with providing enhanced surface properties.

U.S. Pat. No. 4,144,089 discloses a process for bleaching wooden articles. In the process, the articles are sequentially treated in a sequence of work stations by sodium carbonate, a hydrogen peroxide mist, and a weak acid, with intermediate drying operations. There are a number of disadvantages associated with the device disclosed in this patent. For one thing, a group of large work stations are provided, and the treated article is moved from one station to another. For another thing, the articles that are treated are immersed in baths of liquid treating agents. In this respect, it would be desirable if a composition and method were provided that permits a stationary wooden object to be treated without moving the wooden object. It would also be desirable if a composition and method were provided that permits a stationary wooden object to be treated to remove biological stains by brushing or spraying the object.

Another problem associated with the bleaching process disclosed in U.S. Pat. No. 4,144,089 is that a plurality of bleaching agents are employed in a plurality of sequentially applied bleaching steps. In this respect, it would be desirable if a composition and method were provided for bleaching wooden articles that employs a single bleaching step.

Yet another problem associated with the bleaching process disclosed in U.S. Pat. No. 4,144,089 is that there is no disclosure of steps to be taken to preserve dimensional or surface properties of the treated articles during the bleaching process. Apparently, if dimensional or surface properties are to be considered, they are to be considered after the bleaching process has been completed. In this respect, it would be desirable if a composition and method were provided for treating wooden articles that provides treatment for surface properties, other than biological stains, during a bleaching process.

In the bleaching process disclosed in U.S. Pat. No. 4,144,089, the wooden article is moved from station to station to be treated successively by different treating agents at each station. It would be desirable, however, if a stationary, wooden article could be treated at one location by a plurality of different treating agents.

In the bleaching process disclosed in U.S. Pat. No. 4,144,089, separate treating agents are employed at separate stations because the treating agents would be incompatible with one another if they were mixed together. In contrast, if plural treating agents were compatible with one another, then the plural treating agents could be mixed together and applied to the wooden article in one application step. In this respect, it would be desirable if a composition and method were provided for treating wood that included plural ingredients that are compatible with one another and that can be applied in one treating step.

Although two treating agents may be compatible with one another in a single application step, it is possible that, for a number of reasons, the two compatible treating agents should be separated from one another during storage, but that they should be mixed together just prior to a single application step. In this respect, it would be desirable if a composition and method were provided for treating wood that kept plural treating agents separate from one another during storage but that combined the treating agents just prior to a single application step.

Thus, while the foregoing body of prior art indicates it to be well known to use bleaching agents for treating wooden surfaces, the prior art described above does not teach or suggest a bleaching and finishing composition and method which has the following combination of desirable features: (1) removes discoloration to a greater extent than prior art wood treating techniques; (2) reduces problems of dimensional stability of the wood that occur with the use of conventional techniques for removing biological staining; (3) reduces biological stains on wood without obscuring or matting the surface of the wood; (4) permits a stationary wooden object to be treated without moving the wooden object; (5) permits a stationary wooden object to be treated to remove biological stains by brushing or spraying the object; (6) employs a single bleaching step; (7) provides treatment for surface properties, other than biological stains, during a bleaching process; (8) treats a stationary wooden article at one location by a plurality of different treating agents; (9) includes plural ingredients that are compatible with one another and that can be applied in one treating step; and (10) keeps plural treating agents separate from one another during storage and combines the treating agents just prior to a single application step. The foregoing desired characteristics are provided by the unique bleaching and finishing composition and method of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved bleaching and finishing composition for bleaching and finishing a solid substrate which includes a first component blend which includes a quantity of a latex resin in a range spanning 20–30% by weight of the first component blend and a quantity of a bleaching solution present in a range spanning 70–80% by weight of the first component blend.

A second component blend includes a quantity of a latex resin in a range spanning 20–35% by weight of the second component blend, a quantity of an alcohol in a range spanning 13–16% by weight of the second component blend, a quantity of water in a range spanning 48–60% by weight of the second component blend, a quantity of a substrate treating material in a range spanning 0.5–1.0% by weight of the second component blend, and a quantity of an alkalizing agent in a range spanning 2–3% by weight of the second component blend.

The first component blend and the second component blend are maintained separated from each other in storage, and the first component blend and the second component blend may be mixed together prior to use on the substrate. Preferably, the substrate is wood.

The latex resin is selected from the group consisting of acrylic and vinyl latex resins. The latex resin may be a mixture of an acrylic latex resin and a vinyl latex resin.

The bleaching solution is selected from the group consisting of a solution of hydrogen peroxide and a solution of sodium hypochlorite. The bleaching solution may be a mixture of a solution of hydrogen peroxide and a solution of sodium hypochlorite.

The second component blend may also include a quantity of a coloring agent for tinting the substrate to a desired shade of color.

The alcohol is selected from the group consisting of methyl alcohol, ethyl alcohol, isopropyl alcohol, and propyl alcohol.

When the substrate is wood, the substrate treating material is selected from the group consisting of tannic acid and vegetable tannin. The substrate treating material may be a mixture of tannic acid and vegetable tannin.

The alkalizing agent is selected from the group consisting of sodium hydroxide and ammonium hydroxide. The alkalizing agent may be a mixture of sodium hydroxide and ammonium hydroxide.

In accordance with the invention, a method is provided for bleaching and finishing a solid substrate. The method of the invention includes the steps of first obtaining a first component blend which includes a quantity of a latex resin in a range spanning 20–30% by weight of the first component blend and a quantity of a bleaching solution present in a range spanning 70–80% by weight of the first component blend. Then, a second component blend is obtained which includes a quantity of a latex resin in a range spanning 20–35% by weight of the second component blend, a quantity of an alcohol in a range spanning 13–16% by weight of the second component blend, a quantity of water in a range spanning 48–60% by weight of the second component blend, a quantity of a substrate treating material in a range spanning 0.5–1.0% by weight of the second component blend, and a quantity of an alkalizing agent in a range spanning 2–3% by weight of the second component blend. Then, the first component blend with the second component blend are mixed to form a mixture. Then, the mixture is applied to a substrate surface. Then, the substrate surface is dried by a heat producing device in a temperature range spanning 70–160 degrees Fahrenheit.

The second component blend may also include a quantity of coloring agent for tinting the substrate to a desired shade of color.

In accordance with a variation of the method of the invention of bleaching and finishing a solid substrate, in a first step, a first component blend is obtained which includes a quantity of a latex resin in a range spanning 20–30% by weight of the first component blend and a quantity of a bleaching solution present in a range spanning 70–80% by weight of the first component blend. Then, the first component blend is applied to a substrate surface. Then, the substrate surface which has the first component blend applied thereon is dried. A second component blend is obtained which includes a quantity of a latex resin in a range spanning 20–35% by weight of the second component blend, a quantity of an alcohol in a range spanding 13–16% by weight of the second component blend, a quantity of water in a range spanning 48–60% by weight of the second component blend, a quantity of a substrate treating material in a range spanning 0.5–1.0% by weight of the second component blend, and a quantity of an alkalizing agent in a range spanning 2–3% by weight of the second component blend. The second component blend is applied to the substrate surface previously treated with the first component blend and previously dried. Then, the substrate surface which has the first component blend and the second component blend applied thereon is dried.

The second component blend may also include a quantity of coloring agent for tinting the substrate to a desired shade of color. The substrate surface that has an applied first component blend or second component blend is dried by a heat producing device in a temperature range spanning 70–160 degrees Fahrenheit.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred methods of employing the compositions of the invention in detail, it is understood that the invention is not limited in its application to the details of the compositions and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other compositions and methods for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved bleaching and finishing composition and method which has all of the advantages of the prior art and none of the disadvantages.

It is another object of the present invention to provide a new and improved bleaching and finishing composition and method which may be easily and efficiently manufactured and marketed.

It is a further object of the present invention to provide a new and improved bleaching and finishing composition and method which is of durable and reliable construction.

An even further object of the present invention is to provide a new and improved bleaching and finishing composition and method which is susceptible of a low cost of manufacture with regard to both materials and labor, and which accordingly is then susceptible of low prices of sale to the consuming public, thereby making such bleaching and finishing composition and method available to the buying public.

Still yet a further object of the present invention is to provide a new and improved bleaching and finishing composition and method which removes discoloration due to biological staining from wood to a greater extent than prior art wood treating techniques.

Still another object of the present invention is to provide a new and improved bleaching and finishing composition and method that reduces problems of dimensional stability of the wood that occur with the use of conventional techniques for removing biological staining.

Yet another object of the present invention is to provide a new and improved bleaching and finishing composition and method which reduces biological stains on wood without obscuring or matting the surface of the wood.

Even another object of the present invention is to provide a new and improved bleaching and finishing composition and method that permits a stationary wooden object to be treated without moving the wooden object.

Still a further object of the present invention is to provide a new and improved bleaching and finishing composition and method which permits a stationary wooden object to be treated to remove biological stains by brushing or spraying the object.

Yet another object of the present invention is to provide a new and improved bleaching and finishing composition and method that employs a single bleaching step.

Still another object of the present invention is to provide a new and improved bleaching and finishing composition and method which provides treatment for surface properties, other than biological stains, during a bleaching process.

Yet another object of the present invention is to provide a new and improved bleaching and finishing composition and method that treats a stationary wooden article at one location by a plurality of different treating agents.

Still a further object of the present invention is to provide a new and improved bleaching and finishing composition and method that includes plural ingredients that are compatible with one another and that can be applied in one treating step.

Yet another object of the present invention is to provide a new and improved bleaching and finishing composition and method which keeps plural treating agents separate from one another during storage and combines the treating agents just prior to a single application step.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a flowchart of a first embodiment of a method of using the bleaching and finishing composition of the invention which employs applying all composition ingredients in a single application step.

FIG. 2 is a flowchart of a second embodiment of a method of using the bleaching and finishing composition of the invention which employs applying the component containing the bleaching agent in a first application step, followed by application of the component containing the surface treating agent in a second application step.

DESCRIPTION OF THE PREFERRED EMBODIMENT

With reference to the drawings, a new and improved bleaching and finishing composition and method embodying the principles and concepts of the present invention will be described.

A new and improved bleaching and finishing composition for bleaching and finishing a solid substrate includes a first component blend which includes a quantity of a latex resin in a range spanning 20–30% by weight of the first component blend and a quantity of a bleaching solution present in a range spanning 70–80% by weight of the first component blend.

A second component blend includes a quantity of a latex resin in a range spanning 20–35% by weight of the second component blend, a quantity of an alcohol in a range spanning 13–16% by weight of the second component blend, a quantity of water in a range spanning 48–60% by weight of the second component blend, a quantity of a substrate treating material in a range spanning 0.5–1.0% by weight of the second component blend, and a quantity of an alkalizing agent in a range spanning 2–3% by weight of the second component blend.

The first component blend and the second component blend are maintained separated from each other in storage, and the first component blend and the second component blend may be mixed together prior to use on the substrate. Preferably, the substrate is wood. The latex resin is selected from the group consisting of acrylic and vinyl latex resins. The latex resin may be a mixture of an acrylic latex resin and a vinyl latex resin.

The bleaching solution is selected from the group consisting of a solution of hydrogen peroxide and a solution of sodium hypochlorite. The bleaching solution may be a mixture of a solution of hydrogen peroxide and a solution of sodium hypochlorite.

The second component blend may also include a quantity of a coloring agent for tinting the substrate to a desired shade of color.

The alcohol is selected from the group consisting of methyl alcohol, ethyl alcohol, isopropyl alcohol, and propyl alcohol.

When the substrate is wood, the substrate treating material is selected from the group consisting of tannic acid and vegetable tannin. The substrate treating material may be a mixture of tannic acid and vegetable tannin.

The alkalizing agent is selected from the group consisting of sodium hydroxide and ammonium hydroxide. The alkalizing agent may be a mixture of sodium hydroxide and ammonium hydroxide.

As shown in FIG. 1, in accordance with the invention, a method is provided for bleaching and finishing a solid substrate. The method of the invention includes the steps of first obtaining a first component blend which includes a quantity of a latex resin in a range spanning 20–30% by weight of the first component blend and a quantity of a bleaching solution present in a range spanning 70–80% by weight of the first component blend. Then, a second component blend is obtained which includes a quantity of a latex resin in a range spanning 20–35% by weight of the second component blend, a quantity of an alcohol in a range spanning 13–16% by weight of the second component blend, a quantity of water in a range spanning 48–60% by weight of the second component blend, a quantity of a substrate treating material in a range spanning 0.5–1.0% by weight of the second component blend, and a quantity of an alkalizing agent in a range spanning 2–3% by weight of the second component blend. Then, the first component blend with the second component blend are mixed to form a mixture. Then, the mixture is applied to a substrate surface. Then, the substrate surface is dried by a heat producing device in a temperature range spanning 70–160 degrees Fahrenheit.

The second component blend may also include a quantity of coloring agent for tinting the substrate to a desired shade of color.

As shown in FIG. 2, in accordance with a variation of the method of the invention of bleaching and finishing a solid substrate, in a first step, a first component blend is obtained which includes a quantity of a latex resin in a range spanning 20–30% by weight of the first component blend and a quantity of a bleaching solution present in a range spanning 70–80% by weight of the first component blend. Then, the first component blend is applied to a substrate surface. Then, the substrate surface which has the first component blend applied thereon is dried. A second component blend is obtained which includes a quantity of a latex resin in a range spanning 20–35% by weight of the second component blend, a quantity of an alcohol in a range spanning 13–16% by weight of the second component blend, a quantity of water in a range spanning 48–60% by weight of the second component blend, a quantity of a substrate treating material in a range spanning 0.5–1.0% by weight of the second component blend, and a quantity of an alkalizing agent in a range spanning 2–3% by weight of the second component blend. The second component blend is applied to the substrate surface previously treated with the first component blend and previously dried. Then, the substrate surface which has the first component blend and the second component blend applied thereon is dried.

The second component blend may also include a quantity of coloring agent for tinting the substrate to a desired shade of color. The substrate surface that has an applied first component blend or second component blend is dried by a heat producing device in a temperature range spanning 70–160 degrees Fahrenheit.

The first component blend, the second component blend, or the mixture of the first and second component blends can be applied to the substrate in conventional ways such as by brushing or spraying. The substrate surface that has the first component blend, the second component blend, or the mixture of the first and second component blends applied thereto can be dried by a heat gun that produces a heated air stream in a temperature range spanning 70–160 degrees Fahrenheit.

When the first component blend is first applied to the substrate and dried, the resin bleach bleaches discoloration, provides a thin white coating, eliminates after-yellowing tendency, and is fast acting. When the second component blend in used as a top coating, the reactive component imparts color and luster, magnifies and control grain pattern, controls pore size, and transforms the surface to look natural.

Use of the compositions of the invention in the methods described offers distinct advantages. When the first component blend and the second component blend are mixed together to form a mixture, application of the mixture of a substrate provides a one-step application to the substrate. The use of the composition of the invention along with the method of the invention provides excellent color shades and dimensional stability. Its surface texture meets the appearance-type properties of a natural finish. No processing problems like prolonged drying cycles are necessary with employing the compositions and methods of the invention. Also, with the invention there are no problems of defibering as in the case of rattan poles, cores, and wickers.

The compositions and methods of the invention can be used with other substrates besides wood.

All of the ingredients of the first component blend and the second component blend of the invention are easily obtained, off-the-shelf materials that can be readily obtained. The water-based nature of the components of the invention provides for easy dilution and easy clean up.

As an Example, 125 grams of an acrylic latex resin is blended with 125 grams of a vinyl latex resin. This provides 250 grams of a blend of an acrylic latex resin and a vinyl latex resin. To this, 375 grams of a 3% hydrogen peroxide and 375 grams of a commercial laundry bleach are added. What is obtained at this point is 1,000 grams of a first component blend of resin and bleach.

As a further Example, 125 grams of an acrylic latex resin is blended with 125 grams of a vinyl latex resin. This provides 250 grams of a blend of an acrylic latex resin and a vinyl latex resin. To this, 150 grams of CDA denatured alcohol are added. To this 557.5 grams of water are added. To this 3.75 grams of tannic acid and 3.75 grams of vegetable tannin are added. To this, 12.5 grams of a 5% sodium hydroxide solution and 12.5 grams of a 5% ammonium hydroxide solution are added. To this 10 grams of a brown tint are added. What is obtained at this point is 1,000 grams of a second component blend of the invention.

Now, 500 grams of the exemplary first component blend and 500 grams of the exemplary second component blend are mixed together to form 1,000 grams of a mixture of the first and second component blends. This mixture is sprayed onto wood. The wood is dried with a heat gun at a temperature of approximately 120 degrees Fahrenheit. The above-recited example conforms to the method depicted in the flowchart in FIG. 1.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved bleaching and finishing composition and method that is low in cost, relatively simple in composition and methods of application, and which may advantageously be used to remove discoloration of wood due to biological staining to a greater extent than prior art wood treating techniques. With the invention, a bleaching and finishing composition and method is provided which reduces problems of dimensional stability of the wood that occur with the use of conventional techniques for removing biological staining. With the invention, a bleaching and finishing composition and method is provided which reduces biological stains on wood without obscuring or matting the surface of the wood. With the invention, a bleaching and finishing composition and method is provided which permits a stationary wooden object to be treated without moving the wooden object. With the invention, a bleaching and finishing composition and method is provided which permits a stationary wooden object to be treated to remove biological stains by brushing or spraying the object. With the invention, a bleaching and finishing composition and method is provided which employs a single bleaching step. With the invention, a bleaching and finishing composition and method is provided which provides treatment for surface properties, other than biological stains, during a bleaching process. With the invention, a bleaching and finishing composition and method is provided which treats a stationary wooden article at one location by a plurality of different treating agents. With the invention, a bleaching and finishing composition and method is provided which includes plural ingredients that are compatible with one another and that can be applied in one treating step. With the invention, a bleaching and finishing composition and method is provided which keeps plural treating agents separate from one another during storage and combines the treating agents just prior to a single application step.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A method of bleaching and finishing a solid substrate, comprising the steps of:
    obtaining a first component blend consisting essentially of, a quantity of a latex resin in a range spanning 20-30% by weight of said first component blend and
    a quantity of a bleaching solution present in a range spanning 70-80% by weight of said first component blend, obtaining a second component blend consisting essentially of a quantity of a latex resin in a range spanning 20-35% by weight of said second component blend,
    a quantity of an alcohol selected from the group consisting of methyl alcohol, ethyl alcohol, isopropyl alcohol, and propyl alcohol in a range spanning 13-16% by weight of said second component blend, a quantity of water in a range spanning 48-60% by weight of said second component blend,
    a quantity of a substrate treating material in range spanning 0.5-1.0% by weight of said second component blend, and
    a quantity of an alkalizing agent in a range spanning 2-3% by weight of said second component blend,
    mixing the first component blend with the second component blend to form a mixture, applying the mixture to a substrate surface, and drying the substrate surface.

2. The method described in claim 1 wherein the substrate surface is dried by heat in a temperature range spanning 70-160 degrees Fahrenheit.

3. The method described in claim 1 wherein the second component blend additionally consists essentially of a quantity of coloring agent for tinting the substrate.

4. A method of bleaching and finishing a solid substrate, comprising the steps of:
    obtaining a first component blend consisting essentially of a quantity of a latex resin in a range spanning 20–30% by weight of said first component blend and a quantity of a bleaching solution present in a range spanning 70–80% by weight of said first component blend, applying the first component blend to a substrate surface, and drying the substrate surface having the first component blend applied thereon, obtaining a second component blend consisting essentially of a quantity of a latex resin in a range spanning 20–35% by weight of said second component blend, a quantity of an alcohol selected from the group consisting of methyl alcohol, ethyl alcohol, isopropyl alcohol, and propyl alcohol in a range spanning 13–16% by weight of said second component blend, a quantity of water in a range spanning 48–60% by weight of said second component blend, a quantity of a substrate treating material in a range spanning 0.5–1.0% by weight of said second component blend, and a quantity of an alkalizing agent in a range spanning 2–3% by weight of said second component blend, applying the second component blend to the substrate surface previously treated with the first component blend and dried, and drying the substrate surface having the first component blend and the second component blend applied thereon.

5. The method described in claim 4 wherein the second component blend additionally consists essentially of a quantity of coloring agent for tinting the substrate.

6. The method described in claim 4 wherein the substrate surface having an applied first component blend or second component blend is dried by heat in a temperature range spanning 70–160 degrees Fahrenheit.

* * * * *